United States Patent
Kong et al.

(10) Patent No.: US 10,158,339 B2
(45) Date of Patent: Dec. 18, 2018

(54) CAPACITIVE COMPENSATION STRUCTURES USING PARTIALLY MESHED GROUND PLANES

(71) Applicant: Intel Corporation, Santa Clara, CA (US)

(72) Inventors: Jackson Chung Peng Kong, Tanjung Tokong (MY); Bok Eng Cheah, Bayan Lepas (MY); Khang Choong Yong, Puchong (MY); Howard L. Heck, Hillsboro, OR (US); Wil Choon Song, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 14/966,635

(22) Filed: Dec. 11, 2015

(65) Prior Publication Data

US 2017/0170799 A1    Jun. 15, 2017

(51) Int. Cl.
*H05K 5/00*  (2006.01)
*H03H 7/38*  (2006.01)
(Continued)

(52) U.S. Cl.
CPC ............ *H03H 7/38* (2013.01); *G06F 13/382* (2013.01); *G06F 17/5072* (2013.01); *G06F 17/5081* (2013.01); *H01P 3/026* (2013.01); *H01P 3/08* (2013.01); *H05K 1/025* (2013.01); *H05K 1/0224* (2013.01); *H05K 1/18* (2013.01); *H05K 3/0005* (2013.01); *G06F 17/5036* (2013.01); *G06F 2217/82* (2013.01); *H05K 1/0215* (2013.01); *H05K 1/0216* (2013.01); *H05K 1/0218* (2013.01); *H05K 1/0245* (2013.01); *H05K 1/0298* (2013.01); *H05K 9/0039* (2013.01);
(Continued)

(58) Field of Classification Search
CPC ....... H05K 1/0218; H05K 2201/09218; H05K 2201/0929; H05K 2201/093; H05K 2201/09327; H05K 1/0215; H05K 1/0224; H05K 9/0039; H01P 9/00; H01P 3/003; H01P 3/026; H01P 3/08
USPC ........ 361/753, 760, 777, 799, 800; 174/261; 333/124–128, 161, 238
See application file for complete search history.

(56) References Cited

U.S. PATENT DOCUMENTS

| 5,112,419 A | 5/1992 | Nakagawa |
| 2008/0266028 A1 | 10/2008 | Wyland |

(Continued)

OTHER PUBLICATIONS

PCT International Search Report, PCT Application No. PCT/US2016/056991, dated Jan. 23, 2017, 3 pages.

*Primary Examiner* — Binh Tran
(74) *Attorney, Agent, or Firm* — International IP Law Group, P.L.L.C.

(57) ABSTRACT

Techniques for reducing multi-reflection noise via compensation structures are described herein. An example system includes a capacitive component. The example system further includes a capacitive compensation structure coupled to two ends of the capacitive component. The example system includes a partially meshed ground plane coupled to one side of a dielectric substrate. The example system also includes one or more signal conductors coupled to another side of the dielectric substrate and electrically coupled to the capacitive component. The one or more signal conductors are located parallel to a meshed length of the partially meshed ground plane.

11 Claims, 10 Drawing Sheets

(51) Int. Cl.
*G06F 13/38* (2006.01)
*G06F 17/50* (2006.01)
*H01P 3/08* (2006.01)
*H05K 1/18* (2006.01)
*H05K 3/00* (2006.01)
*H01P 3/02* (2006.01)
*H05K 7/00* (2006.01)
*H05K 7/18* (2006.01)
*H05K 7/14* (2006.01)
*H05K 9/00* (2006.01)
*H05K 1/02* (2006.01)

(52) U.S. Cl.
CPC ............... *H05K 2201/093* (2013.01); *H05K 2201/0929* (2013.01); *H05K 2201/09218* (2013.01); *H05K 2201/09327* (2013.01); *H05K 2201/09681* (2013.01)

(56) References Cited

U.S. PATENT DOCUMENTS

| | | | |
|---|---|---|---|
| 2011/0032048 A1 | 2/2011 | Wu et al. | |
| 2011/0241794 A1 | 10/2011 | Pao et al. | |
| 2011/0279189 A1* | 11/2011 | Umeda | H05K 1/0245 333/5 |
| 2015/0214915 A1* | 7/2015 | Yosui | H03H 7/427 333/181 |
| 2015/0340753 A1 | 11/2015 | Park et al. | |

* cited by examiner

CAPACITIVE COMPENSATION STRUCTURES USING PARTIALLY MESHED GROUND PLANES

TECHNICAL FIELD

The present techniques relate generally to capacitive-compensation circuitry, and more particularly, structures to compensate for capacitive parasitics by use of partially meshed ground planes.

BACKGROUND ART

Interconnect channels are used to connect electronic devices such as USB devices to computing devices. For example, USB devices can include hard disk drives (HDDs) connected with long cables and thumb drives connected via short interconnect channels, among other devices and lengths of interconnect channels.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

As described above, interconnect channels are used to connect electronic devices to computing devices. However, the capacitive nature of multiple components along an interconnect channel inherently introduce an impedance mismatch that deviates from an ideal impedance target, thus generating an unwanted multi-reflection noise. For example, such components can include package components such as controlled collapse chip connection (C4) bumps, plated-through hole (PTH) connections, and ball grid arrays (BGAs). Other capacitive components include board plated-through holes (PTH), alternating current capacitors (AC caps), electrostatic discharge (ESD) diodes, connectors, multiplexers and re-driver packages. The resulting multi-reflection noise can be particularly significant in short channel scenarios such as a Gen2 10 Gbps thumb drive operating according to the USB 3.1 Specification released Jul. 31, 2013. The impact of reflection noise has been determined to be the main reason of severe channel margin degradation observed in short channels such as those in thumb drives. For example, the voltage and timing margins based on 500 defects per million (DPM) margin in a short channel of 3" are approximately 2 mV and 1 ps when utilizing receiver (Rx) continuous-time linear equalizer (CTLE) high-gain circuitry. The reduced margins are caused by increased multireflection noise, which in a 3 dB device with short channel length was shown to have a mean of 33.1 mV, compared to means of 15 mv and 18 mV for 8.5 dB devices with long and medium channel lengths, respectively. As used herein, a short channel length generally refers to a low-loss Host system connecting to thumb drive devices, without external cable assemblies, while a long channel length generally refers to a lossy Host system connecting to lossy devices such as HDD with long external cable. A medium channel length falls between the short and long channel length in terms of system electrical loss.

Some current solutions to reduce multi-reflection noise are dependent upon receiver (Rx) circuit design. In particular, Rx circuit designs typically encompass two extremes, or corners, of gain circuitries, referred to herein by negcap_on and negcap_off. As used herein, negcap_on refers to a high-gain circuitry to negate silicon pad capacitance. Negcap_off, as used herein, refers to a low-gain circuitry, primarily used for short channel applications. Low-gain Rx circuitry (negcap_off is thus used to address the low voltage and timing margins of short channels. However, channel margin degradation caused by multi-reflection noise amplified by high-gain circuitry requires current solutions to dynamically adjust the Vref voltage level based on automatic gain control (AGC) gain prior to the receiver (Rx) front-end module. This increases circuit design complexity and uses a larger area of silicon to implement.

The present techniques relate generally to the design and manufacturing of electronic devices with compensation structures. Embodiments relate to a capacitive compensation structure created from printed circuit board (PCB) parasitic elements to mitigate multi-reflection noise, particularly in short interconnect channels for multi-Gbps differential high-speed input/output (HSIO) links. Parasitic elements, as used herein, refer to capacitance, inductance, and/or resistance in an electrical component that is typically unrelated to the purpose of the component. For example, a resistor may have parasitic capacitance. In addition, the techniques enable removal of any complex receiver (Rx) circuit design that dynamically switches from high-gain circuitry (the default setting to support long board length) to low-gain circuitry when detecting thumb drive devices. A simpler Rx circuit design can make silicon processes more efficient and also save on die size area. For example, RAM, and other types of memory, can be made smaller and more efficiently using the present techniques. Moreover, the techniques herein can be implemented using existing manufacturing capabilities by means of etching and electroplating processes. The techniques can be used to focus on a small segment of PCB area of capacitive components in a balanced T-topology circuitry. By avoiding the use of complex Rx equalization schemes to mitigate the multi-reflection noise, resources can be saved by reducing the need to validate the design during both pre and post-silicon activities. Finally, the present techniques enable saving physical resources since less silicon die area is used.

Figure 1:
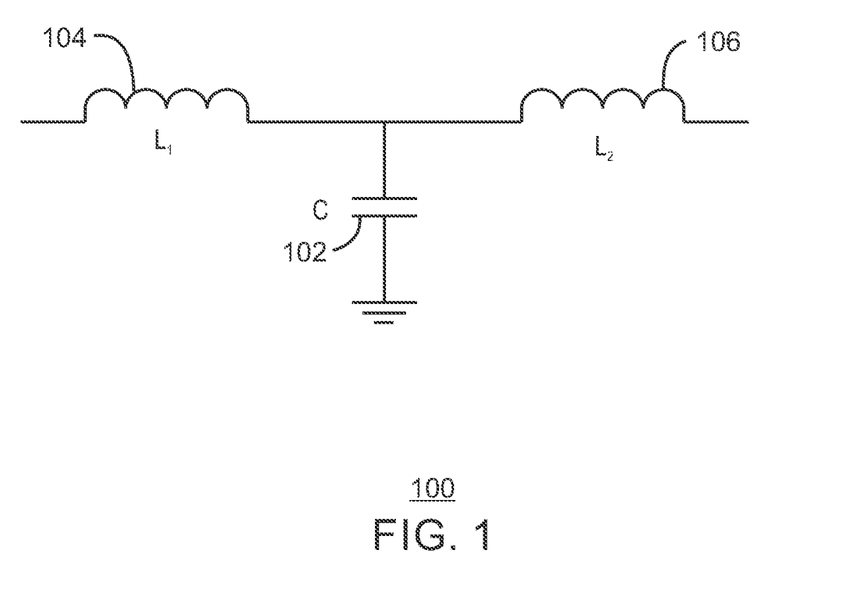
FIG. 1 is a diagram of an example schematic of compensation structures.

FIG. 1 is a diagram of an example schematic of a compensation structure in accordance with embodiments of the present techniques. The example schematic is generally referred to by the reference number 100.

In the example schematic 100, a capacitive parasitic 102 of one or more components is coupled to two inductive compensation structures L1 104 and L2 106. Specifically, the example schematic 100 shows a balanced T-topology circuitry, with two compensation structures 104 and 106 coupled to the capacitive parasitic 102 presented by the on-board components, in a pre-102 and post-102 arrangement. Balanced, as used herein, refers to the inclusion of compensation structures before and after the capacitive parasitics.

In FIG. 1, the capacitive parasitic 102 represents one or more capacitive components of an electronic device. For example, the capacitive parasitic can be associated with any board components that can cause a capacitance as a capacitive parasitic, including board plated-through hole (PTH) connections, electrostatic discharge diodes (ESDs), multiplexing (Mux), and re-driver packages, among other capacitive components.

The compensation structures 104, 106 can include a partial metal mesh as described in greater detail with respect to FIGS. 2 and 3 below. In some examples, the compensation structures 104, 106 include any form of parasitic inductor. The length of the compensation structures 104, 106 can be based on an I/O critical wavelength. For example, in high-speed signaling beyond 1 Gbps, the T-topology circuitry can be in the order of one-fifth (⅕) to one-fifteenth (1/15) of the I/O critical wavelength, and be considered a lumped model. Accordingly, as used herein, the critical I/O wavelength is based on the signal frequency of the circuit. A lumped model, as used herein, refers to a model that is a combined structure. Compensation structures larger than described above may introduce an additional impedance mismatch and thus multi-reflection noise to the channel. A critical length of a lumped structure is typically about a millimeter for high speed input/output (HSIO) interconnect channels.

The diagram of FIG. 1 is not intended to indicate that the example schematic 100 is to include all of the components shown in FIG. 1. Further, the example schematic 100 may include any number of additional components not shown in FIG. 1, depending on the details of the specific implementation. In addition, although a T-topology is shown for example, the present techniques can be used with any suitable topology.

Figure 2:
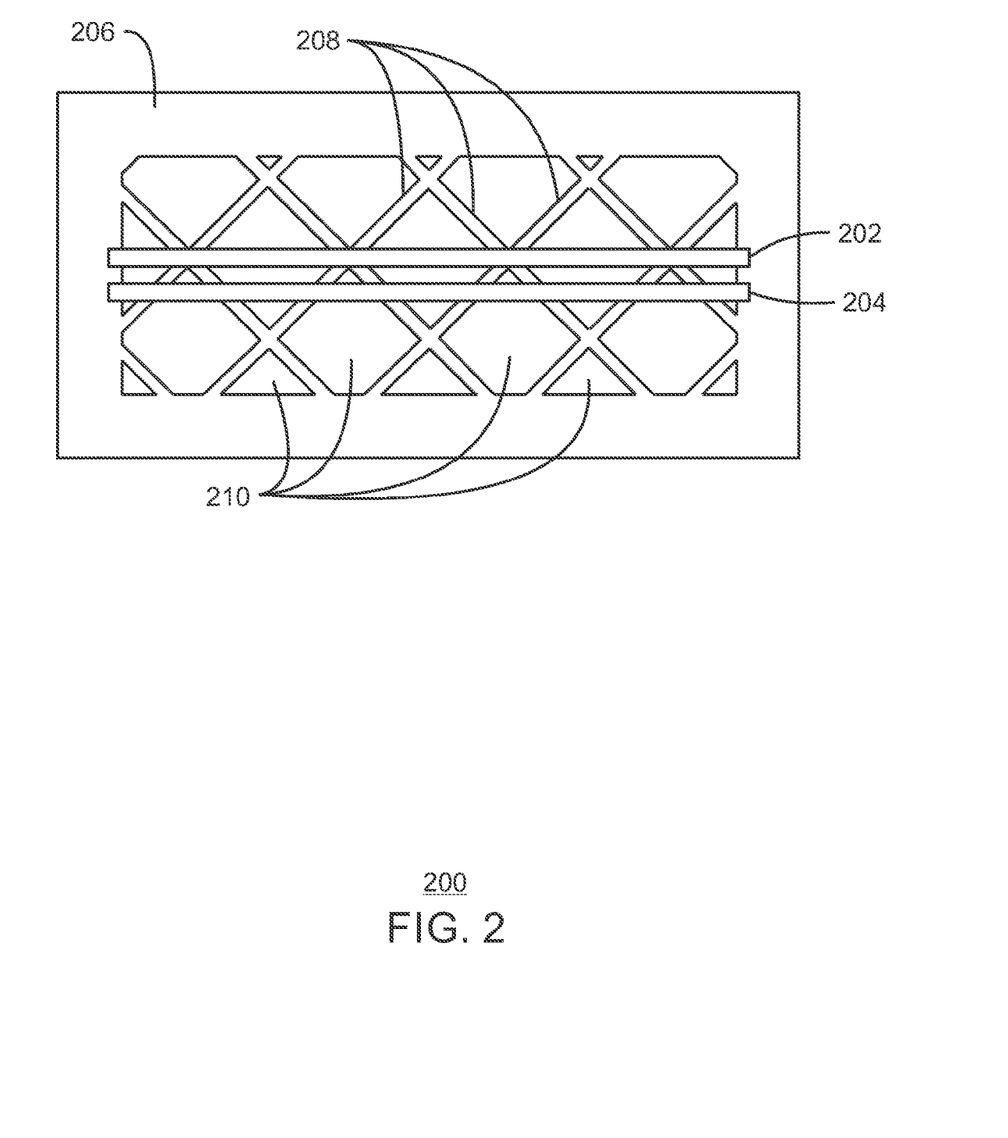
FIG. 2 is a top down view of an example compensation structure.

FIG. 2 is a top down view of an example compensation structure in accordance with embodiments of the present techniques. The example compensation structure is generally referred to by the reference number 200.

The example compensation structure 200 includes two signal conductors 202, 204, shown running parallel to each other and across a partially meshed ground plane 206. For example, the signal conductors 202, 204 can be microstrips. In some examples, the signal conductors 202, 204 can be striplines. In some examples, the signal conductors 202, 204 can be part of a differential bus or a single-ended bus. The two signal conductors 202, 204 and the partially meshed ground plane can be formed from any suitable conductive material, including metals such as copper and gold. The ground plane 206 includes a partial mesh 208 with a pattern of cutouts 210. A non-conductive substrate (not shown) separates the partially meshed ground plane 206 from the signal conductors 202, 204. For example, the non-conductive substrate can be made of a dielectric material that can be polarized by applying an electrical field.

In the compensation structure 200 of example of FIG. 2, the two signal conductors 202, 204 have an associated capacitive and inductive parasitic. In order to reduce the associated parasitic, the present techniques increase the inductance of the ground plane by removing portions of the ground plane to produce a partially meshed ground plane 206. The resonant frequency impedance equation of an inductance capacitance (LC) filter can be given by the equation:

$$Z = \sqrt{L/C} \qquad \text{(Eq. 1)}$$

wherein Z is the impedance value, L is the inductance of the filter, and C is the capacitance of the filter. The present techniques reduce capacitance parasitics via a partially meshed ground plane.

In some examples, a spacing and a shielding of adjacent signaling lanes using the two signal conductors 202, 204 can be based on an integrated crosstalk noise (ICN) level. For example, the spacing and shielding effectiveness of adjacent signal conductors can be arranged to maintain integrated crosstalk noise (ICN) below a threshold level. In some examples, the critical length of the mesh can be calculated based on the frequency of the signaling lanes, approximated by one-fifth (⅕) to one-fifteenth (1/15) of signal wavelength by the equation:

$$\lambda = \frac{c}{f} \qquad \text{(Eq. 2)}$$

wherein λ is the signal wavelength, c is the speed of light in interconnect, and f is the frequency of signaling.

The top down view of FIG. 2 is not intended to indicate that the example compensation structure 200 is to include all of the components shown in FIG. 2. Further, the example compensation structure 200 may include any number of additional components not shown in FIG. 2, depending on the details of the specific implementation.

Figure 3:
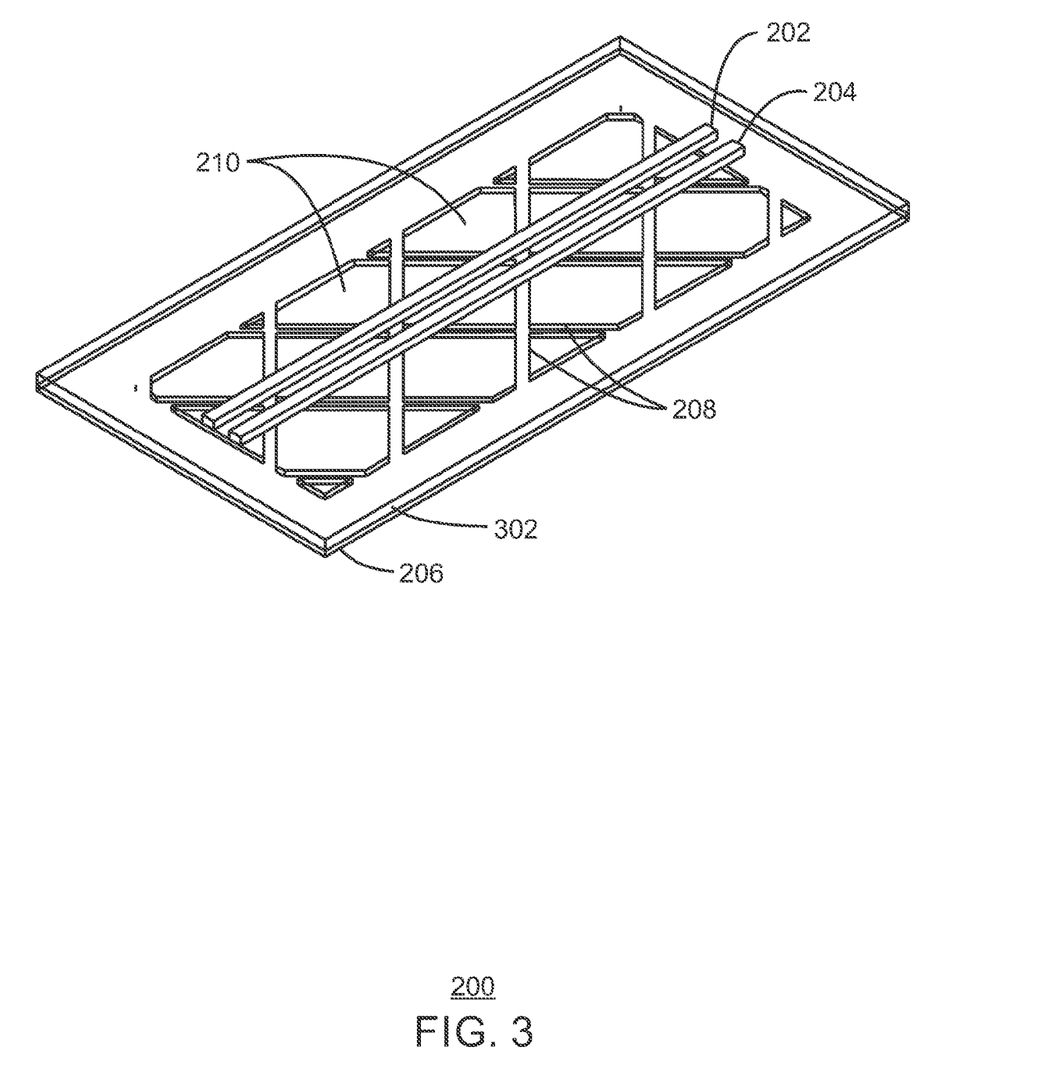
FIG. 3 is an angled perspective of an example compensation structure.

FIG. 3 is an angled perspective of an example compensation structure in accordance with embodiments of the present techniques. The example compensation structure is the same example compensation structure 200 of FIG. 2.

In FIG. 3, the side edges of the compensation structure 200 are visible. In addition to the features described in FIG. 2, the compensation structure 200 is shown to have two layers, including a partially meshed conductive ground plane 206 coupled to a non-conductive substrate layer 302 that is a full non-meshed plane on top of the meshed ground plane 206. Two signal conductors 202, 204 are shown on top of the non-conductive substrate layer 302. For example, the signal conductors can be microstrips. The microstrips can be arranged as signal conductors over a ground plane. In some examples, the signal conductors can be striplines. The striplines can be arranged as signal conductors between two ground planes. In some examples, the non-conductive substrate layer can be a dielectric substrate.

The angled perspective of FIG. 3 is not intended to indicate that the example compensation structure 200 is to include all of the components shown in FIG. 3. Further, the example compensation structure 200 may include any number of additional components not shown in FIG. 3, depending on the details of the specific implementation.

Figure 4:
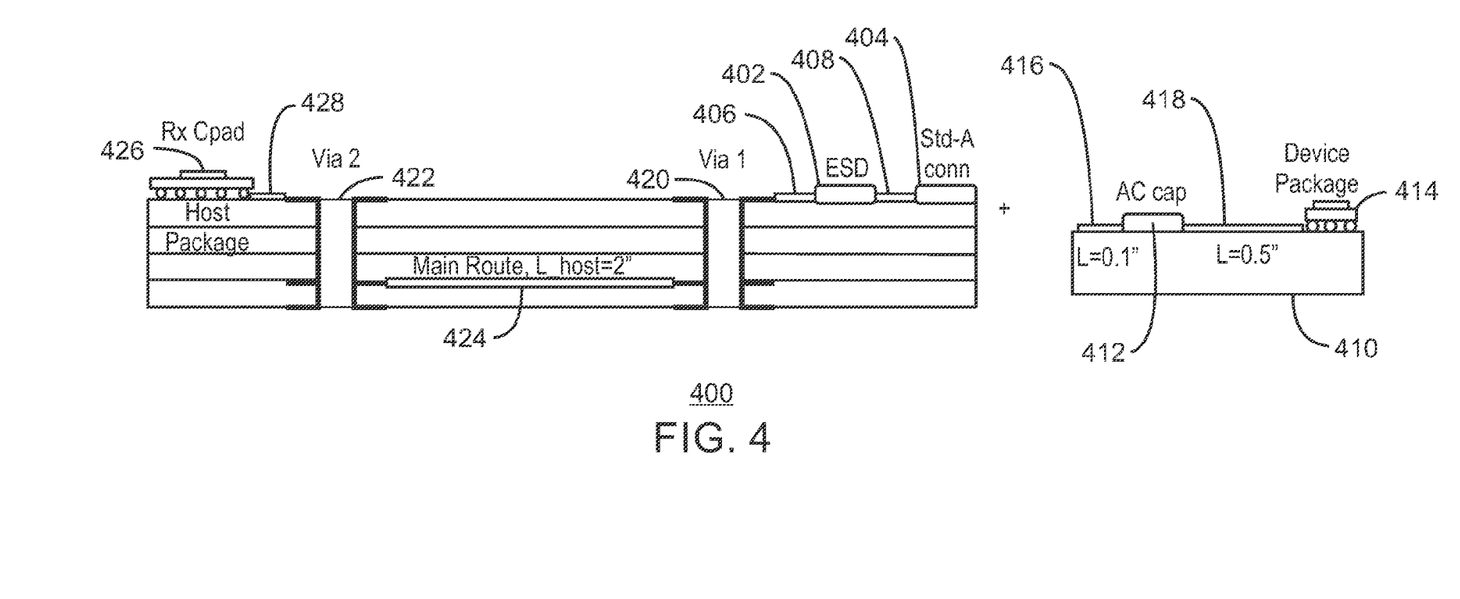
FIG. 4 is a block diagram of an example system with a compensation structure.

FIG. 4 is a cross section of an example printed wiring board design with a compensation structure in accordance with embodiments of the present techniques. The example printed wiring board design is generally referred to by the reference number 400.

The example printed wiring board (PWB) design 400 includes four layers with a plurality of capacitive components. In particular, the example PWB design 400 includes an ESD component 402, an interface connector 404, and two microstrips 406, 408. In another embodiment, an external device 410 is shown with an alternating current capacitor (AC cap) 412 and microstrips 416, 418 having example lengths of 0.1" and 0.5" respectively may be coupled to the interface connector 404. In some examples, the capacitive compensation structure of FIGS. 1-3 may also be implemented before and after the capacitive components of the external device 410, such as the AC cap 412. The example PWB 400 also includes two vias 420, 422 connected by a 2" main route 424, and a host package 426 connected to via 428 via interconnect 430. In some examples, the microstrip 416 may directly couple to the host package 426 without passing through the vias 420, 422.

In the example printed wiring board (PWB) design 400, 0.1" and 1.0" length compensation structures can be applied to the microstrips 406, 408. Time domain reflectrometry (TDR) measurements can be taken to quantify channel impedance mismatch, and thus reflection noise, for each length used. The 1.0" inch length TDR measurement results are described with respect to FIG. 5A below and the 0.1" length TDR measurement results are discussed with respect to FIG. 5B below.

The cross section of FIG. 4 is not intended to indicate that the example PWB design 400 is to include all of the components shown in FIG. 4. Further, the example PWB design 400 may include any number of additional components not shown in FIG. 4, depending on the details of the specific implementation. For example, although the compensation structures were applied before and after the ESD component for purposes of the comparison study, the present techniques could also be applied between the host package and the via 422 at the interconnect 428 and between the two vias 420, 422 at the main route 424.

Figure 5A:
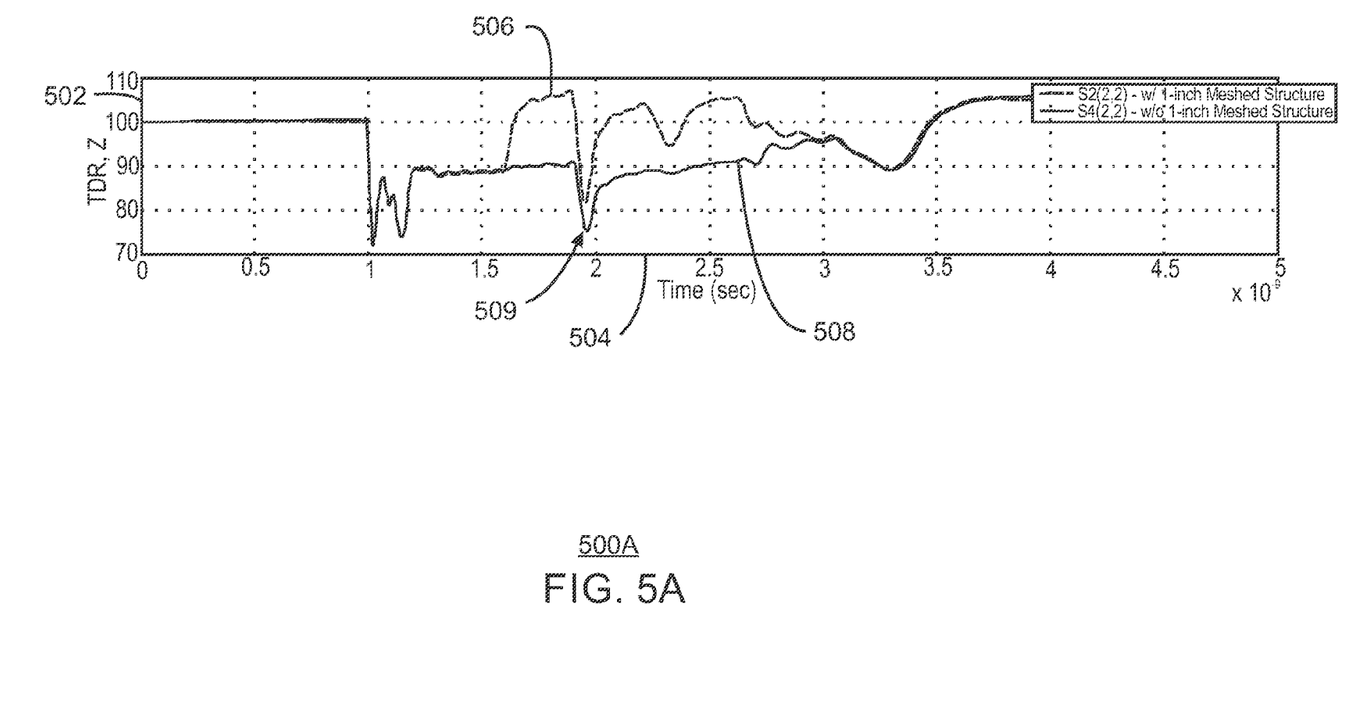
FIG. 5A is a time domain reflectometry graph of an example device including a 1-inch compensation structure.

FIG. 5A is a time domain reflectometry graph of an example device including a 1-inch compensation structure in accordance with embodiments of the present techniques. The graph is generally referred to by the reference number 500A and is discussed with respect to the example PWB design 400 of FIG. 4.

The graph 500A shows impedance in ohms 502 over time 504 of an example device with a 1" meshed compensation structure and without the 1" compensation structure. The 1" meshed compensation structure performance is indicated by a dashed line 506 and the performance without the compensation structure is indicated by a solid line 508. An impedance associated with an ESD is indicated by an arrow 509.

As shown in graph 500A, the average impedance of a cable pair is 100 ohms. Impedance values deviating from this 100 ohm baseline indicates impedance mismatching. In the example of 500A, applying 1" compensation structures introduced a larger channel mismatch. The increased mismatch can be attributed to the size of the compensation structure as compared to the critical length or lumped model limit as discussed above. Thus, the use of compensation structures above the critical length or lumped model length limit can actually increase impedance mismatch rather than reducing impedance mismatch.

Figure 5B:
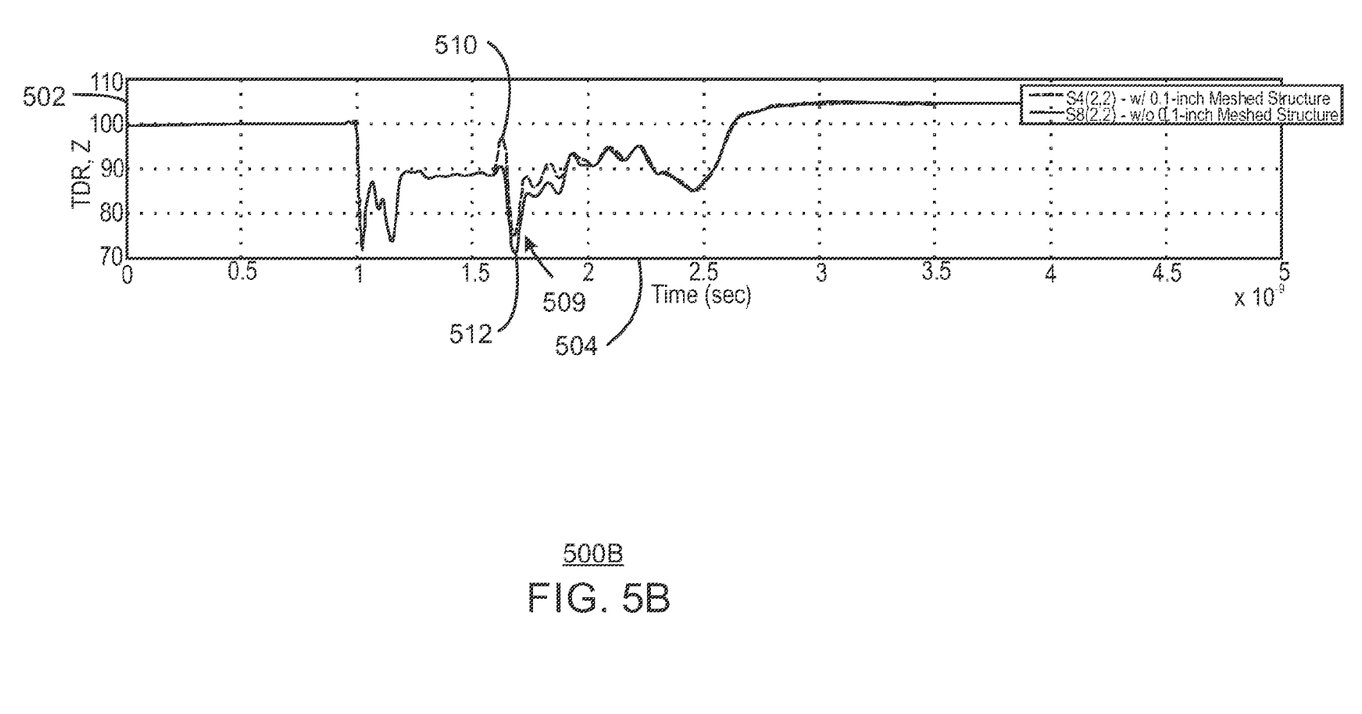
FIG. 5B is a time domain reflectometry graph of an example device including a 0.1-inch compensation structure.

FIG. 5B is a time domain reflectometry graph of an example device including a 0.1-inch compensation structure in accordance with embodiments of the present techniques. The graph is generally referred to by the reference number 500B and is discussed with respect to the example PWB design 400 of FIG. 4.

The graph 500B shows impedance in ohms 502 over time 504 of an example device with a 0.1" meshed compensation structure and without the 0.1" compensation structure. The 0.1" meshed compensation structure performance is indicated by a dashed line 510 and the performance without the 0.1" compensation structure is indicated by a solid line 512. An impedance associated with an ESD is indicated by an arrow 509.

As shown in graph 500B, applying 0.1" compensation structures results in a "pull up" of the problematic capacitive region as indicated by a raised dashed line 510 as compared to the solid line 512. Thus, graph 500B confirms that a compensation structure with a length smaller than the critical length results in better impedance matching.

Figure 6A:
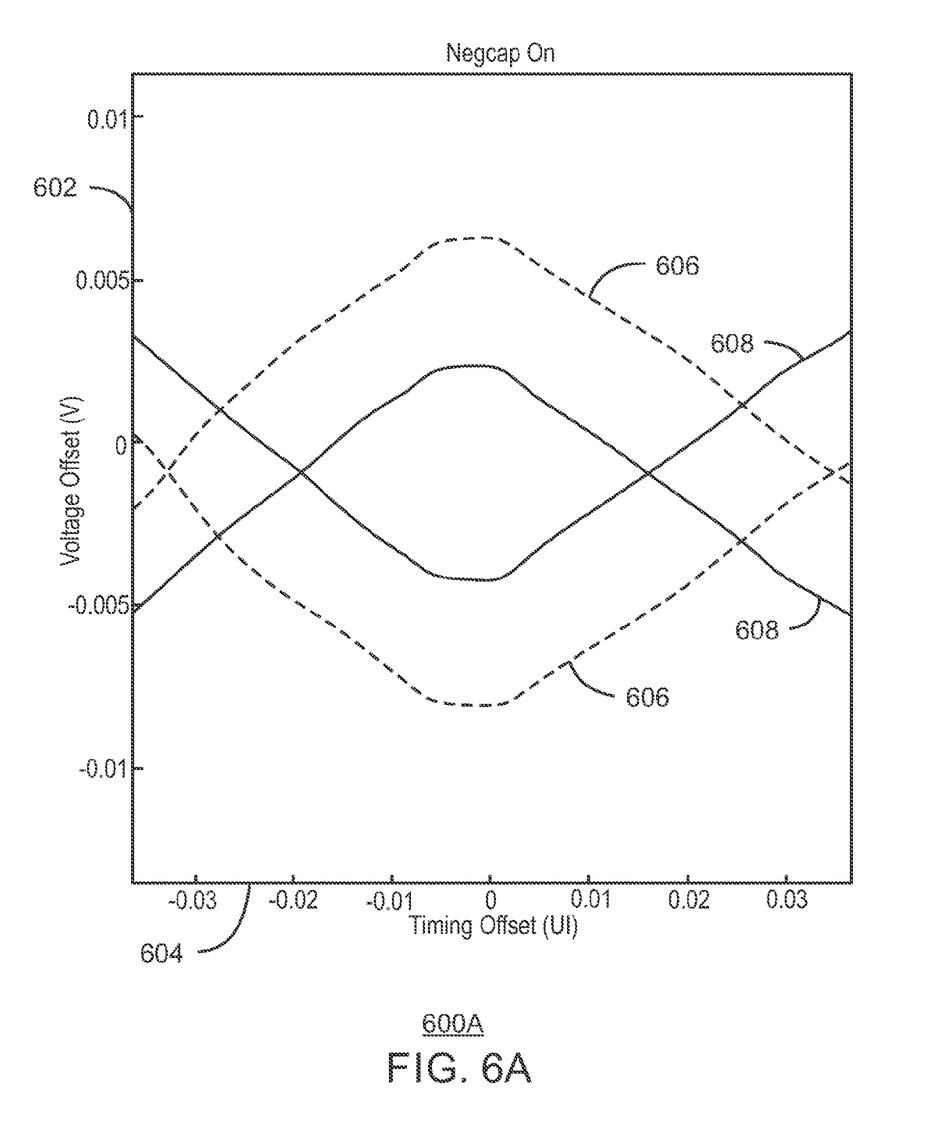
FIG. 6A is an eye diagram of an example device with a compensation structure in a negcap_off scenario.

FIG. 6A is an eye diagram of an example device with compensation structure in high-gain circuitry negcap_on scenario in accordance with embodiments of the present techniques. The eye margin graph depicting voltage offset 602 as a function of timing offset 604 is generally referred to by the reference number 600A. Voltage margin with the compensation structure is indicate by dashed lines 606. Voltage margin without the compensation structure is indicated by solid lines 608.

As shown in graph 600A, the eye margin of a tested device with compensation structure is greater than the eye margin of a tested device without compensation structure in the negcap_on scenario using high-gain circuitry.

Figure 6B:
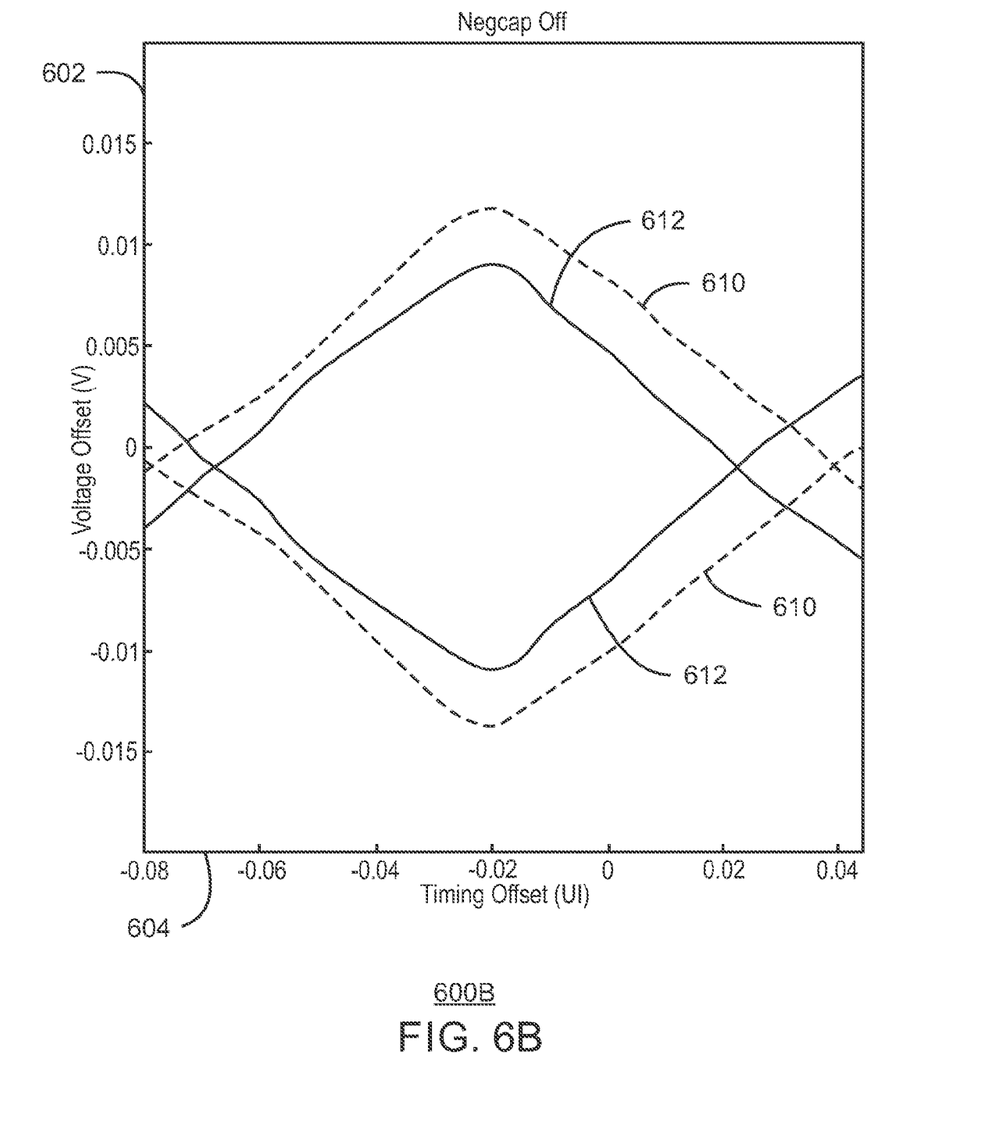
FIG. 6B is an eye diagram of an example device with a compensation structure in a negcap_on scenario.

FIG. 6B is an eye diagram of an example device with compensation structure in low-gain circuitry negcap_off scenario in accordance with embodiments of the present techniques. The eye margin graph again depicting voltage offset 602 as a function of timing offset 604 is generally referred to by the reference number 600B. Voltage margin with the compensation structure is indicate by dashed lines 610. Voltage margin without the compensation structure is indicated by solid lines 612.

As shown in graph 600B, the eye margin of a tested device with compensation structure is also greater than the eye margin of a tested device without compensation structure in the negcap_off scenario using low-gain circuitry. In some examples, the margin enhancement brought by the compensation structure in the negcap_on case of FIG. 6A can match or be even better than a scenario utilizing negcap_off without the compensation structure. Thus, the current techniques can meet or exceed performance characteristics of more complex and expensive current circuit designs.

Figure 7:
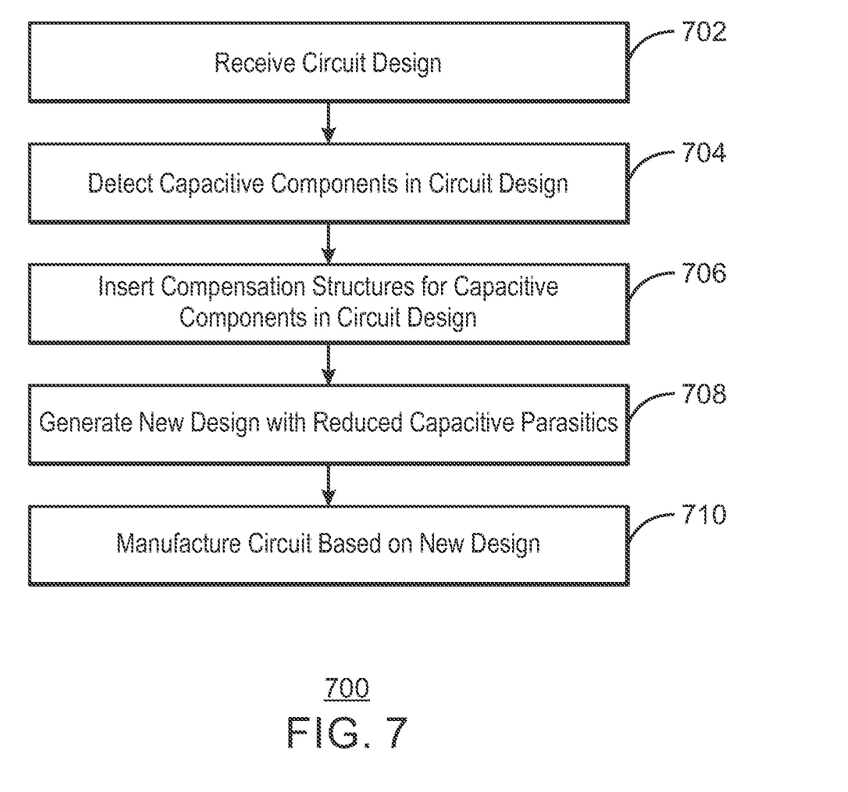
FIG. 7 is a block flow diagram of a method of designing and manufacturing a circuit.

FIG. 7 is a block flow diagram of an example method of designing and manufacturing a circuit in accordance with embodiments of the present techniques. The example method is generally referred to by the reference number 700. The method can be implemented at least partially using the processor 802 of FIG. 8 below.

At block 702, the processor receives a circuit design. For example, the circuit design may contain a plurality of components associated with capacitive parasitics.

At block 704, the processor detects capacitive components in the circuit design. For example, the capacitive component can include package components such as controlled collapse chip connection (C4) bumps, plated-through hole (PTH) connections, and ball grid arrays (BGAs). Other capacitive components include board plated-through holes (PTH), alternating current capacitors (AC caps), electrostatic discharge (ESD) diodes, connectors, multiplexers and re-driver packages.

At block 706, the processor inserts capacitive compensation structures for capacitive components in the circuit design. In some examples, the ground plane under connectors electrically coupled to capacitive components can be modified into a partial mesh. For example, the connectors may be microstrips. In some examples, the length of the mesh compensation structure can be less than a critical length. For example, the critical length can be a fraction of an I/O critical wavelength. For example, the critical length for PCIe Gen1, PCIe Gen 2, PCIe Gen 3, SATA Gen 2, and SATA Gen 3 connections in millimeters is 1.378 mm, 1.378 mm, 0.909 mm, 1.378 mm, and 0.915 mm. The critical length can thus be based on the frequency of the connections. In some examples, the processor can thus remove portions of the ground plane to produce the partially meshed ground plane. For example, by removing the portions of the ground plane, the processor can increase the parasitic inductance of the ground plane.

At block 708, the processor generates a new design with the capacitive compensation structures. For example, the new design may have reduced capacitive parasitics due to the compensation structures. In some examples, the processor can generate a spacing and a shielding of adjacent signaling lanes using the two signal conductors 202, 204 based on an integrated crosstalk noise (ICN) level. For example, the processor can adjust spacing and shielding of adjacent signal conductors to maintain integrated crosstalk noise (ICN) below a threshold level.

At block 710, a circuit is manufactured based on the new design. For example, the circuit can include modified ground planes including mesh compensation structures.

This process flow diagram is not intended to indicate that the blocks of the example method 700 are to be executed in any particular order, or that all of the blocks are to be included in every case. Further, any number of additional blocks not shown may be included within the example method 700, depending on the details of the specific implementation.

Figure 8:
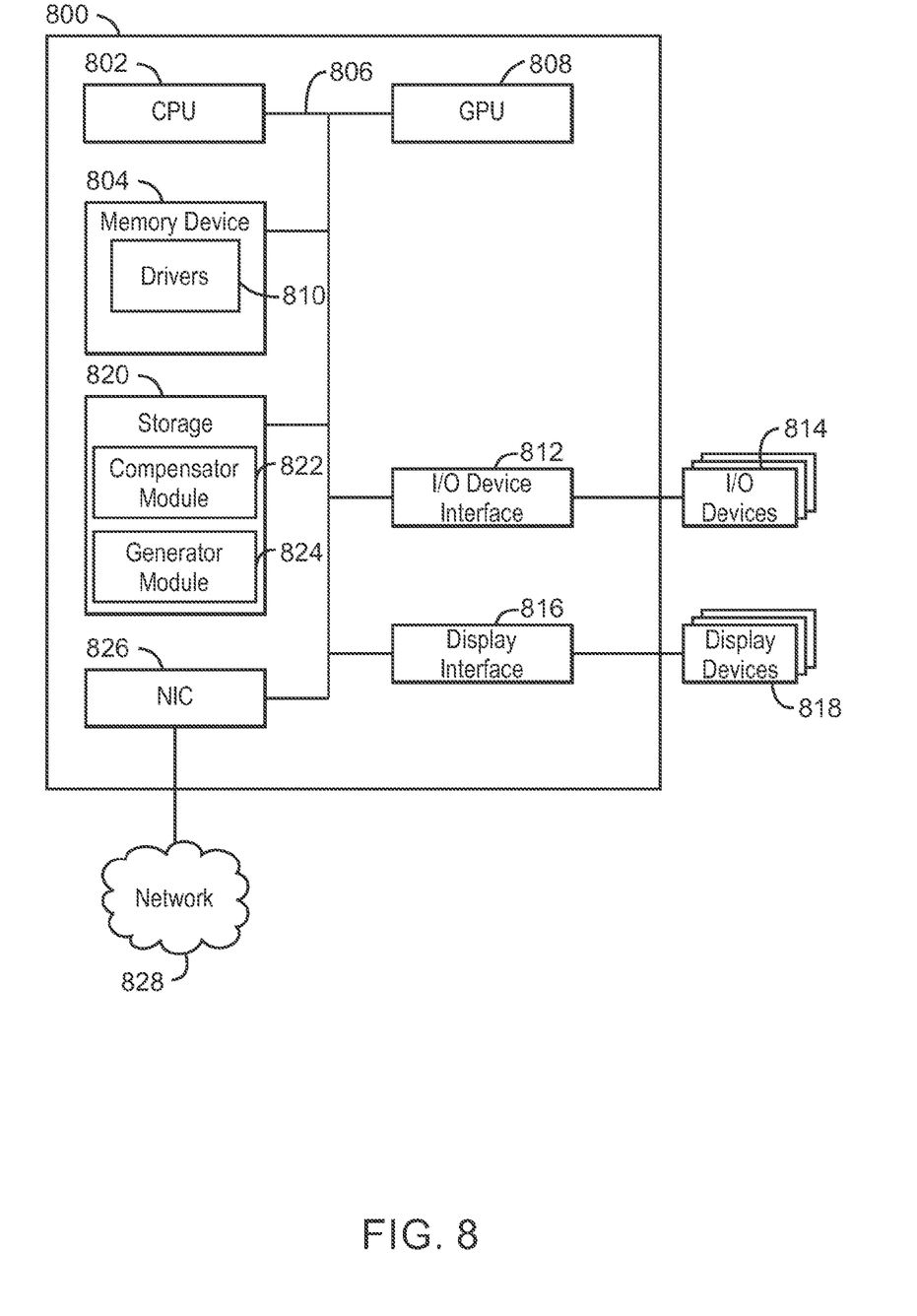
FIG. 8 is block diagram illustrating an example computing device that can be used to generate circuit designs with compensation structures.

FIG. 8 is a block diagram illustrating an example computing device that can be used to generate circuit designs with compensation structures. The computing device 800 may be, for example, a laptop computer, desktop computer, tablet computer, mobile device, or server, among others. The computing device 800 may include a central processing unit (CPU) 802 that is configured to execute stored instructions, as well as a memory device 804 that stores instructions that are executable by the CPU 802. The CPU 802 may be coupled to the memory device 804 by a bus 806. Additionally, the CPU 802 can be a single core processor, a multi-core processor, a computing cluster, or any number of other configurations. Furthermore, the computing device 800 may include more than one CPU 802. The memory device 804 can include random access memory (RAM), read only memory (ROM), flash memory, or any other suitable memory systems. For example, the memory device 804 may include dynamic random access memory (DRAM).

The computing device 800 may also include a graphics processing unit (GPU) 808. As shown, the CPU 802 may be coupled through the bus 806 to the GPU 808. The GPU 808 may be configured to perform any number of graphics operations within the computing device 800. For example, the GPU 808 may be configured to render or manipulate graphics images, graphics frames, videos, or the like, to be displayed to a user of the computing device 800.

The memory device 804 can include random access memory (RAM), read only memory (ROM), flash memory, or any other suitable memory systems. For example, the memory device 804 may include dynamic random access memory (DRAM). The memory device 804 may include device drivers 810 that are configured to execute the instructions for device discovery. The device drivers 810 may be software, an application program, application code, or the like.

The CPU 802 may also be connected through the bus 806 to an input/output (I/O) device interface 812 configured to connect the computing device 800 to one or more I/O devices 814. The I/O devices 814 may include, for example, a keyboard and a pointing device, wherein the pointing device may include a touchpad or a touchscreen, among others. The I/O devices 814 may be built-in components of the computing device 800, or may be devices that are externally connected to the computing device 800. In some examples, the memory 804 may be communicatively coupled to I/O devices 814 through direct memory access (DMA).

The CPU 802 may also be linked through the bus 806 to a display interface 816 configured to connect the computing device 800 to a display device 818. The display device 818 may include a display screen that is a built-in component of the computing device 800. The display device 818 may also include a computer monitor, television, or projector, among others, that is internal to or externally connected to the computing device 800. In some examples, the compensation structure of FIGS. 1-3 above can be used before and after any capacitive elements of computing device 800.

The computing device also includes a storage device 820. The storage device 820 is a physical memory such as a hard drive, an optical drive, a thumbdrive, an array of drives, or any combinations thereof. The storage device 820 may also include remote storage drives. The storage device 820 includes a compensator module 822 and a generator module 824. The compensator module 822 may be used to insert compensation structures into circuit designs. For example, the compensator module 822 can receive a circuit design. The compensator module 822 can insert a capacitive compensation structure for a capacitive component in the circuit design. For example, the compensator module 822 can modify a portion of a ground plane adjacent to one or more signal conductors electrically coupled to the capacitive component into a partially meshed ground plane. For example, the signal conductors can be microstrips or striplines. The generator module 824 may be used to generate a new design with the capacitive compensation structure. In some examples, a circuit may then be manufactured based on the new design.

The computing device 800 may also include a network interface controller (NIC) 826. The NIC 826 may be configured to connect the computing device 800 through the bus 806 to a network 828. The network 828 may be a wide area network (WAN), local area network (LAN), or the Internet, among others. In some examples, the device may communicate with other devices through a wireless technology. For example, Bluetooth® or similar technology may be used to connect with other devices.

The block diagram of FIG. 8 is not intended to indicate that the computing device 800 is to include all of the components shown in FIG. 8. Rather, the computing system 800 can include fewer or additional components not illustrated in FIG. 8, such as sensors, power management integrated circuits, additional network interfaces, and the like. The computing device 800 may include any number of additional components not shown in FIG. 8, depending on the details of the specific implementation. Furthermore, any of the functionalities of the CPU 802 may be partially, or entirely, implemented in hardware and/or in a processor. For example, the functionality of the compensator module 822 and the generator module 824 may be implemented with an application specific integrated circuit, in logic implemented in a processor, in logic implemented in a specialized graphics processing unit, or in any other device.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Example 1 is a system. The system includes a capacitive component and a capacitive compensation structure coupled to two ends of the capacitive component. The capacitive compensation structure includes a partially meshed ground plane coupled to one side of a dielectric substrate and one or more signal conductors coupled to another side of the dielectric substrate and electrically coupled to the capacitive component. The one or more signal conductors located parallel to a meshed length of the partially meshed ground plane.

Example 2 includes the system of example 1, including or excluding optional features. In this example, the meshed length includes a length less than a critical length based on an input/output (I/O) critical wavelength associated with a frequency of the electronic apparatus.

Example 3 includes the system of any one of examples 1 to 2, including or excluding optional features. In this example, the capacitive compensation structure includes a parasitic inductor.

Example 4 includes the system of any one of examples 1 to 3, including or excluding optional features. In this example, the one or more signal conductors include one or more microstrips.

Example 5 includes the system of any one of examples 1 to 4, including or excluding optional features. In this example, a spacing and a shielding of the one or more signal conductors is based on an integrated crosstalk noise (ICN) level.

Example 6 includes the system of any one of examples 1 to 5, including or excluding optional features. In this example, the one or more signal conductors include a differential bus or a single-ended bus.

Example 7 includes the system of any one of examples 1 to 6, including or excluding optional features. In this example, the apparatus includes a USB device including a short interconnect channel for differential high-speed input/output (HSIO) links.

Example 8 includes the system of any one of examples 1 to 7, including or excluding optional features. In this example, the partially meshed ground plane includes a conductive material.

Example 9 includes the system of any one of examples 1 to 8, including or excluding optional features. In this example, the one or more signal conductors include one or more striplines.

Example 10 includes the system of any one of examples 1 to 9, including or excluding optional features. In this example, the capacitive compensation structure is to reduce multireflection noise via inductance.

Example 11 is a method for reducing multi-reflection noise in a circuit. The method includes receiving, via a processor, a circuit design; detecting, via the processor, a capacitive component in the circuit design; inserting, via the processor, a capacitive compensation structure for the capacitive component in the circuit design; and generating, via the processor, a new design with the capacitive compensation structure.

Example 12 includes the method of example 11, including or excluding optional features. In this example, the method includes manufacturing a circuit based on the new design.

Example 13 includes the method of any one of examples 11 to 12, including or excluding optional features. In this example, inserting the capacitive compensation structure further includes modifying a portion of a ground plane adjacent to one or more signal conductors electrically coupled to the capacitive component into a partially meshed ground plane.

Example 14 includes the method of any one of examples 11 to 13, including or excluding optional features. In this example, inserting the capacitive compensation structure further includes removing portions of a ground plane to produce a partially meshed ground plane.

Example 15 includes the method of any one of examples 11 to 14, including or excluding optional features. In this example, inserting the capacitive compensation structure further includes modifying a ground plane before and after the capacitive component.

Example 16 includes the method of any one of examples 11 to 15, including or excluding optional features. In this example, the capacitive compensation structure includes a portion of mesh with a length less than a critical length based on an input/output critical wavelength.

Example 17 includes the method of any one of examples 11 to 16, including or excluding optional features. In this example, the new design includes reduced capacitive parasitics.

Example 18 includes the method of any one of examples 11 to 17, including or excluding optional features. In this example, the new design is to reduce multireflection noise via inductance.

Example 19 includes the method of any one of examples 11 to 18, including or excluding optional features. In this example, the method includes adjusting spacing and shielding of adjacent signal conductors to maintain integrated crosstalk noise (ICN) below a threshold level.

Example 20 includes the method of any one of examples 11 to 19, including or excluding optional features. In this example, the circuit design includes a plurality of components associated with capacitive parasitics, the capacitive compensation structure to be inserted for each of the components associated with capacitive parasitics.

Example 21 is a device for reduced multi-reflection noise. The device includes a partially meshed conductive ground plane coupled to one side of a dielectric substrate; and one or more signal conductors coupled to another side of the dielectric substrate and electrically coupled to the capacitive component, the one or more signal conductors located parallel to a meshed length of the partially meshed conductive ground plane.

Example 22 includes the device of example 21, including or excluding optional features. In this example, the meshed length includes a length less than a critical length based on an input/output (I/O) critical wavelength.

Example 23 includes the device of any one of examples 21 to 22, including or excluding optional features. In this example, the partially meshed conductive ground plane includes a parasitic inductor.

Example 24 includes the device of any one of examples 21 to 23, including or excluding optional features. In this example, the one or more signal conductors include one or more microstrips.

Example 25 includes the device of any one of examples 21 to 24, including or excluding optional features. In this example, a spacing and a shielding of the one or more signal conductors is based on an integrated crosstalk noise (ICN) level.

Example 26 includes the device of any one of examples 21 to 25, including or excluding optional features. In this example, a critical length is based on the frequency of signals to be used on the one or more signal conductors.

Example 27 includes the device of any one of examples 21 to 26, including or excluding optional features. In this example, one or more signal conductors include a differential bus or a single-ended bus.

Example 28 includes the device of any one of examples 21 to 27, including or excluding optional features. In this example, the one or more signal conductors include one or more striplines.

Example 29 includes the device of any one of examples 21 to 28, including or excluding optional features. In this example, the device includes a circuit board.

Example 30 includes the device of any one of examples 21 to 29, including or excluding optional features. In this example, the capacitive compensation structure is to reduce multireflection noise via inductance.

Example 31 is an apparatus. The apparatus includes means for compensating capacitive parasitics in a circuit coupled to two ends of a capacitive component, wherein the means for compensating capacitive parasitics includes: means for grounding the circuit coupled to one side of a dielectric substrate; and means for conducting a signal coupled to another side of the dielectric substrate and electrically coupled to the capacitive component, the means for conducting a signal located parallel to a meshed length of the partially meshed ground plane.

Example 32 includes the apparatus of example 31, including or excluding optional features. In this example, the meshed length includes a length less than a critical length based on an input/output (I/O) critical wavelength associated with a frequency of the electronic apparatus.

Example 33 includes the apparatus of any one of examples 31 to 32, including or excluding optional features. In this example, the means for compensating capacitive parasitics includes a parasitic inductor.

Example 34 includes the apparatus of any one of examples 31 to 33, including or excluding optional features. In this example, the means for grounding the circuit include one or more microstrips.

Example 35 includes the apparatus of any one of examples 31 to 34, including or excluding optional features. In this example, a spacing and a shielding of the means for conducting a signal is based on an integrated crosstalk noise (ICN) level.

Example 36 includes the apparatus of any one of examples 31 to 35, including or excluding optional features. In this example, the means for conducting the signal include a differential bus or a single-ended bus.

Example 37 includes the apparatus of any one of examples 31 to 36, including or excluding optional features. In this example, the device includes a USB device including a short interconnect channel for differential high-speed input/output (HSIO) links.

Example 38 includes the apparatus of any one of examples 31 to 37, including or excluding optional features. In this example, the means for grounding the circuit includes a conductive material.

Example 39 includes the apparatus of any one of examples 31 to 38, including or excluding optional features. In this example, the means for conducting the signal include one or more striplines.

Example 40 includes the apparatus of any one of examples 31 to 39, including or excluding optional features. In this example, the means for compensating capacitive parasitics are to reduce multireflection noise via inductance.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
   a capacitive component; and
   a capacitive compensation structure disposed parallel to one or more signal conductors electrically coupled to two ends of the capacitive component, wherein the capacitive compensation structure comprises:
   a partially meshed ground plane coupled to one side of a dielectric substrate; and
   wherein the one or more signal conductors are coupled to another side of the dielectric substrate, the one or more signal conductors located parallel to a meshed length of the partially meshed ground plane, and wherein a length of the compensation structure is equal to or less than approximately one-fifth of a critical wavelength of 0.90 to 1.37 millimeters.

2. The system of claim 1, wherein the capacitive compensation structure comprises a parasitic inductor.

3. The system of claim 1, the one or more signal conductors comprising one or more microstrips.

4. The system of claim 1, wherein a spacing and a shielding of the one or more signal conductors is arranged to maintain an integrated crosstalk noise (ICN) level below a predetermined threshold noise level.

5. The system of claim 1, wherein the one or more signal conductors are part of a differential bus or a single-ended bus.

6. The system of claim 1, wherein the apparatus comprises an input/output (I/O) device interface comprising a short channel length for differential high-speed input/output (HSIO) links.

7. A device for reduced multi-reflection noise in a circuit, comprising:
   a partially meshed conductive ground plane coupled to one side of a dielectric substrate; and
   one or more signal conductors coupled to another side of the dielectric substrate, the one or more signal conductors located parallel to a meshed length of the partially meshed conductive ground plane, wherein a length of a compensation structure comprising the partially meshed conductive ground plane is equal to or less than approximately one-fifth of a critical wavelength corresponding to a frequency of 7.0 to 10.6 gigahertz.

8. The device of claim 7, wherein the partially meshed conductive ground plane comprises a parasitic inductor.

9. The device of claim 7, wherein the one or more signal conductors comprise one or more microstrips.

10. The device of claim 7, wherein a spacing and a shielding of the one or more signal conductors is arranged to maintain an integrated crosstalk noise (ICN) level below a predetermined threshold noise level.

11. The device of claim 7, wherein one or more signal conductors comprise a differential bus or a single-ended bus.

* * * * *